United States Patent

Dollin et al.

[11] Patent Number: 6,088,622
[45] Date of Patent: Jul. 11, 2000

[54] REPORT STREAM DATA RATE REGULATION

[75] Inventors: Christopher James Dollin, Yate; Patrick Goldsack, Chipping Sodbury, both of United Kingdom

[73] Assignee: Hewlett-Packard Company, Palo Alto, Calif.

[21] Appl. No.: 09/005,525

[22] Filed: Jan. 9, 1998

[30] Foreign Application Priority Data

Jan. 13, 1997 [EP] European Pat. Off. ............. 97300172

[51] Int. Cl.$^7$ .................................................. G06F 15/18
[52] U.S. Cl. ................................. 700/28; 700/32; 700/46
[58] Field of Search ............................... 700/28, 32, 46, 700/73, 74; 710/60

[56] References Cited

U.S. PATENT DOCUMENTS

| 4,752,897 | 6/1988 | Zoeller et al. | 364/550 |
|---|---|---|---|
| 5,367,523 | 11/1994 | Chang et al. | 370/84 |
| 5,375,070 | 12/1994 | Hershey et al. | 364/550 |
| 5,521,907 | 5/1996 | Ennis, Jr. et al. | 370/17 |
| 5,619,656 | 4/1997 | Graf | 395/200.11 |
| 5,774,456 | 6/1998 | Ellebracht et al. | 370/242 |
| 5,881,237 | 3/1999 | Schwaller et al. | 395/200.54 |
| 5,937,165 | 8/1999 | Schwaller et al. | 395/200.54 |
| 5,974,457 | 10/1999 | Waclawsky et al. | 709/224 |

FOREIGN PATENT DOCUMENTS 2 271 250 10/1992 United Kingdom .

WO 92/19054 10/1992 WIPO .

OTHER PUBLICATIONS

Hayes, Stephen; Analyzing Network Performance Management; IEEE Communications Magazine, May, 1993; pp. 52–58.

European Search Report, EP 97 30 0172; Jul. 2, 1997.

Article by Kieran Taylor titled "The Low Price of ATM Analysis", Data Communications, Nov. 1995, pp. 103, 105.

Article by Jim Carr titled "Low–Cost Network Monitor Get the LANN Lowdown", Data Communcations, Apr., 1992, pp. 43–44.

*Primary Examiner*—Paul P. Gordon
*Assistant Examiner*—Bethew B. Jennings, III

[57] ABSTRACT

Monitoring apparatus is provided for monitoring an on-going input to detect and report events of a predetermined type as defined by a set of criteria stored by the apparatus. Detected events are reported in a report stream the data rate of which increases with the number of such events. The data rate of the report stream is regulated to lie within upper and lower bounds by changing the selectivity of the set of event-selection criteria. This changing of the selectivity of the critera is effected in such a manner that the events detected with more selective criteria constitute a subset of the events that would have been detected with a less selective criteria. In a preferred embodiment, changing the criteria selectivity is done by changing the length of a bit mask.

20 Claims, 6 Drawing Sheets

| FIG.4A |
| FIG.4B |

REPORT STREAM DATA RATE REGULATION

FIELD OF THE INVENTION

The present invention relates to the regulation of the data rate of a report stream reporting the occurrence of predetermined events in an on-going input that represents, for example, data units being transferred over a connection between first and second points across a network.

BACKGROUND OF THE INVENTION

The monitoring of communication networks often involves the use of remote monitor probes sending back report data to a central measurement station. It is convenient to send the report data back over the same network as is being monitored; however, in doing so, there arises the possibility that the report data stream can affect the operation of the network in a way that invalidates the measurements being made. In many cases, such an adverse effect will be avoided or lie within acceptable bounds if the data rate of the report stream is sufficiently low.

A number of techniques exist for keeping the reporting data rate down. For example, the monitor probes can be arranged to effect initial processing of the measurement results, the results of the processing (such as various statistical measures) then being reported back; this approach is, however, only possible where details of each event of interest do not need to be reported. Another possiblility is for the monitor probes to act on a random sampling basis, reporting only some of the events of interest; this latter approach by its very nature makes it impossible to control exactly which event instances are detected (only event types) so that a particular event instance cannot be tracked across a network.

It is an object of the present invention to provide a way of controlling the report-stream data rate of monitoring apparatus that does not suffer from the above-mentioned drawbacks.

SUMMARY OF THE INVENTION

According to the present invention, there is provided apparatus for monitoring an on-going input to detect and report events of predetermined type, the apparatus comprising:
means for storing an event definition defining an event in terms of a criterion set of one or more criteria to be met by the on-going input;
monitoring means for monitoring the on-going input to detect occurrences therein of an event satisfying the criterion set;
report means for generating a report stream containing data on the detected events, the data rate of the report stream increasing with the number of detected events;
means for producing an indication of the data rate of the report stream; and
control means for regulating the data rate of the report stream in dependence on said indication, this regulation being effected by changing the event definition to change the selectivity of the criterion set in such a manner that the events detected with a more selective form of the criterion set constitute a subset of the events that would have been detected with a less selective form of the criterion set.

By this arrangement, the data rate of the report stream can be regulated, for example, to avoid taking undue bandwidth on a shared link or to match the processing capacity for handling the report stream on receipt. At the same time, a core subset of events is always detected, this core subset corresponding to that detected by the most selective form of the criterion set. This latter characteristic is useful in situations where it is necessary to detect all events of a narrowly defined type regardless of data rate regulation. The characteristic is also useful where two apparatus according to the invention are used to independently detect the same events (for example, at spaced locations across a network) with the respective report streams being correlated on the basis of event signatures contained the report streams; in this case, even if the regulation of the two report streams is uncoordinated, there will be a common set of detected events in both streams.

Preferably, the data rate of the report stream is regulated to lie within upper and lower bounds; where the report stream is carried on a link that also carries other traffic, these bounds can be made dependent on the traffic loading of the link such that the bounds are lower the greater the traffic loading of the link.

Changing the selectivity of the criterion set is preferably effected by changing the currently-operative form of the criterion set between predetermined forms each of different selectivity, each change of selectivity being from the currently-operative form of the criterion set to a predetermined form that is adjacent in terms of its selectivity.

It should be noted that data-rate regulation effected in dependence on the monitored value of the report-stream data rate, may co-exist with another regulation regime in which the report-stream data rate is regulated in dependence on different factors (for example, on the data rate of a different report stream to be correlated with that being regulated). Furthermore, the criterion set may be subject to modification for reasons unrelated to report-stream data rate control, such as to change entirely the type of event to be detected.

The on-going input being monitored represents, for example, a succession of data units in transfer over a connection across a network; in this case, the criterion set may comprise one or more criteria to be met by a group of at least one data unit associated with the connection. Where the on-going input represents the data units as bit patterns, the criterion set can advantageously comprise a bit-mask criterion specifying required bit values in predetermined positions of said bit patterns, the control means increasing/decreasing the selectively of the criterion set by increasing/decreasing the number of bit positions with specified values in the bit-mask criterion.

Preferably, the report means is operative to include in the report stream, criterion-set data concerning the form of the criterion set used in detecting events. This criterion-set data may take the form of an indication of any change in the criterion set upon such change occurring; alternatively, the criterion set data may take the form of an indication, for each detected event, of the form of the criterion set used in detecting that event.

According to another aspect of the present invention, there is provided a method of monitoring an on-going input to detect and report events of predetermined type; said method comprising the steps of:
(a)—monitoring the on-going input to detect occurrences therein of an event satisfying a criterion set of one or more criteria;
(b)—generating a report stream containing data on the detected events, the data rate of the report stream increasing with the number of detected events;
(c)—producing an indication of the data rate of the report stream, and (d)—regulating the data rate of the report stream, in dependence on the indication, by changing the selectivity of the criterion set in such a manner that the events detected with a more selective form of the criterion set constitute a subset of the events that would have been detected with a less selective form of the criterion set.

BRIEF DESCRIPTION OF THE DRAWINGS

Apparatus utilising the invention in carrying out quality of service measurements on a connection across a network, will now be described, by way of non-limiting example, with reference to the accompanying diagrammatic drawings, in which.

BEST MODE OF CARRYING OUT THE INVENTION

Figure 1:
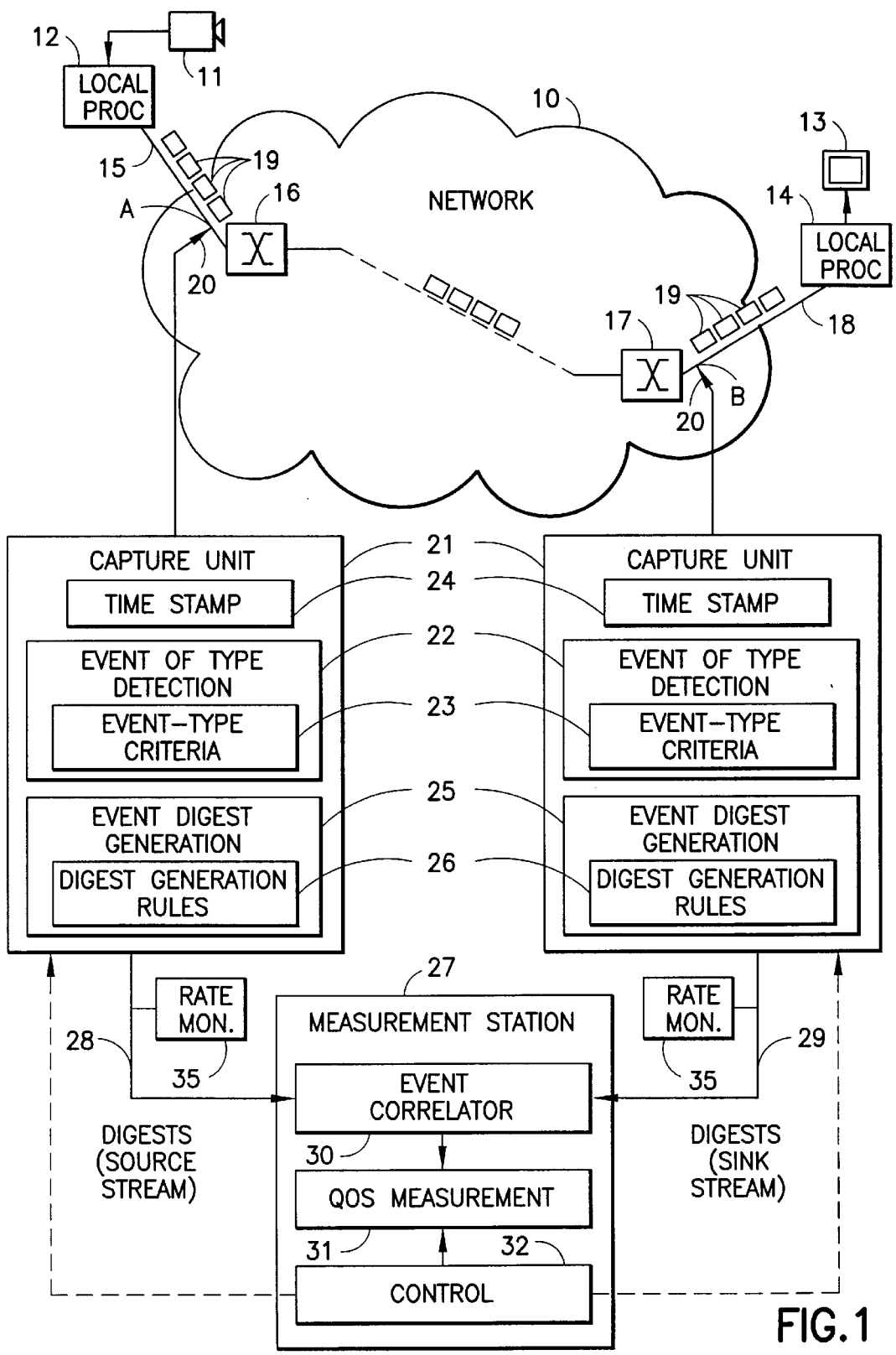
FIG. 1 is a diagram of the overall quality-of-service measurement apparatus and illustrates the monitoring of a network connection at two points by respective event-capture units that provide information back to a common measurement station.

Shown in FIG. 1 is a network 10 used to provide a connection between a data source constituted by a camera 11 and a local processing unit 12, and a remote data receiver constituted by a video monitor 13 and a local processing unit 14.

The local processing unit 12 serves to digitise the output of the camera 11 and transmit the digitised output onto link 15 as a stream of ATM (Asynchronous Transfer Mode) cells 19 of fixed size. The network 10 provides a connection between the link 15 and a link 18 connected to the local processing unit 14 associated with the monitor 14. This connection serves to transfer the ATM cells 19 placed on link 15 by unit 12, to the unit 14 and to this end a path is established through the network 10 via switches 16 and 17 and intermediate elements not illustrated in FIG. 1. In an ATM network, the network nodes (switches 16, 17) set up a connection path through the network as a succession of virtual channels between nodes. Each cell 19 carries a virtual channel identifier which a receiving node uses to route the cell along the corresponding virtual channel to the next node. The virtual channel identifier is updated at each node according to a mapping established at the time the connection is set up.

The ATM cells 19 relating to the connection established between the local processing units 12 and 14 may be mixed in transmission across the network with ATM cells associated with other connections. Indeed, links 15 and 18 may also carry cells relating to a different connection.

Also illustrated in FIG. 1 is monitoring apparatus for measuring the quality of service provided by the connection between a point A on link 15 and a point B on link 18. To this end, respective passive monitoring probes 20 are connected into links 15 and 18 at points A and B.

Event-Capture Units

Each probe 20 is connected to a respective event-capture unit 21 generally co-located with the probe. The two event-capture units are substantially identical in form, each including an event-of-type detection unit 22 that serves to detect predetermined 'events' occuring at the corresponding network point A, B.

An 'event' occurs when a group of one or more cells satisfies a predetermined set of criteria defining a particular event type; this set of criteria (criterion set) comprises one or more predetermined criteria. Each event-of-type detection unit 22 includes storage means 23 for storing the set of criteria defining at least one event type; for simplicity, it will be assumed hereinafter, that only one event type is defined. The defined event type is the same at both event-capture units. The storage means 23 will generally be a memory unit storing the event-definition criteria in an explicit form but it would also be possible to store at least some of these criteria in a more implicit form such as by the hardwiring of circuitry.

Unless it is known that only cells of the connection of interest will appear at the monitored network point, the set of criteria defining an event type will include a criterion that the cell or cells involved in the defined event all relate to the connection of interest. Whilst this criterion will be the same for both event-capture units, the expression of the criterion may differ between these units, depending on how the connection of interest is identifiable at the associated network points A, B. In the present case, cells relating to the connection of interest are identifiable by the virtual channel identifier carried in the cell header. As already indicated, the virtual channel identifier changes as the cells pass from node to node over the network. However, for a given connection, once the connection is established, the virtual channels and thus the virtual channel identifiers used by the connection are fixed for each node-to-node hop. For present purposes, it is assumed that the virtual channel identifiers relevant to the connection of interest at points A and B have been ascertained (for example, by node interrogation) and can be included in the relevant criteria.

The other criteria associated with an event-type definition will depend on the nature of the quality-of-service measurement to be made. If it is simply desired to measure transit time between points A and B, then every cell associated with the connection of interest can constitute an event so that no further qualifying criteria are needed beyond connection identity. However, it may, for example, be desired to define an event in terms of the data content of a cell or of the value of particular bit positions; in this case, an appropriate criterion can be readily specified. Again, the survival across the network of trains of at least five cells may be of interest and in this case a criterion is required to the effect that five cells follow one another at the minimum inter-cell time.

In this last example, the criterion required a knowledge of the time between cells. In fact, many likely criteria will be time related (including absolute-time criteria such as the first cell received after a specified time). To permit the event-of-type detection units 22 to determine whether the monitored cells of the connection of interest meet such time-related criteria, each monitored cell is time stamped upon receipt by a timestamp unit 24.

Thus, as each cell 19 is detected at network point A/B by the corresponding probe 20, it is passed to the associated event-capture unit 21 where it is first time stamped by unit 24 and then examined by the event-of-type detection unit 23 to ascertain whether the cell gives rise to satisfaction of the stored event criteria, either itself or together with previously-detected cells, depending on the criteria. If the stored criteria are satisfied, an event of the defined type is deemed to have occured and the associated cells together with their time stamps are stored for further processing (to be described below). A time stamp corresponding to the time of occurence of the event may also be obtained from the time-stamp unit 24 and saved with the rest of the event data. Note that the time of occurence of an event may differ from its time of detection depending on how the event is defined; for example, an event of a train of five cells can only be detected after the fifth cell is received but the train may be defined as occuring at the time of receipt of the first cell of the train.

The actual processing required to determine whether the event criteria have been satisfied can be carried out in any appropriate manner though typically a program-controlled processor will be used at least for the time-related criteria. For cell bit-position value criteria, dedicated hardware can be used. It may also be useful to carry out connection identity testing on a cell as a preliminary test, since the connection identity criteria will generally be present in all event definition and early elimination of cells of no relevance will ease downstream processing.

The successive satisfaction of the event-type criteria at one network point gives rise to a succession of events each of the same type but each essentially a specific, unique, event in that the group of one or more cells associated with each event is different for each event. In contrast, the same event may occur at both network point A and at network point B, again on the basis of the cell or cells giving rise to an event being detected. A key characteristic of the present measurement method and apparatus is the correlation of the detection of the same event at the two monitored network points. To this end, for every event it detects, each event-capture unit 21, generates a corresponding event report characteristic of that event and sends this report to an event correlator 30, common to both capture units 21. The event correlator 30 then seeks to match up event reports from the two event-capture units 21 to pair those reports relating to the occurence of the same event at points A and B respectively.

The event reports are generated in each event-capture unit 21 by a digest generation unit 25. The term 'digest' is used herein synonymously with 'event report', the term 'digest' being used because generally, though not necessarily, the event report will be of reduced length as compared to the sum of all cells giving rise to the associated event. As will be more fully described below, each digest includes a 'signature' characteristic of the cell or cells giving rising to the event concerned, this signature being generated according to predetermined, programmable, rules stored in memory 26. These rules will generally be the same for both event-capture units so that the signature generated by both units will be the same for the same event.

The digests output from the event-capture unit 21 at point A form a source digest stream 28 whilst the digests output from the event-capture unit 21 at point B form a sink digest stream 29, the terms 'source' and 'sink' having reference to the direction of transit of cells 19 between points A and B.

Figure 2:
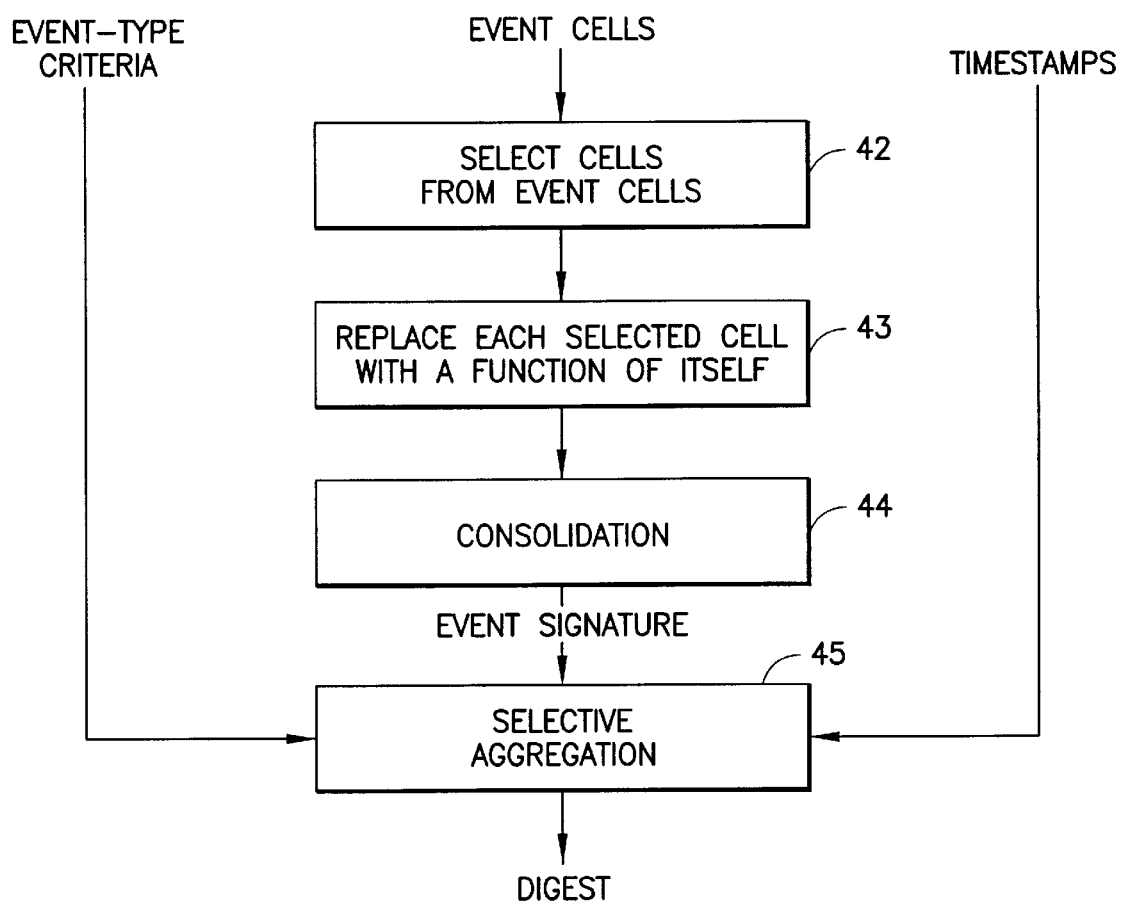
FIG. 2 is a diagram illustrating the formation of an event signature by the event-capture units of FIG. 1.

FIG. 2 illustrates the digest generation process executed by each unit 25, the latter being typically implemented as a program-controlled processor.

A digest comprises the aforesaid event signature. This signature is derived from the cell or cells giving rise to the event. One way of doing this is as follows:

Step 42—First, one or more of the cells are selected (for example, the first cell in a train of cells);

Step 43—Next, each selected cell is replaced by a function of itself. This function may simply be a mask function to select predetermined bit positions, or a more complex function such as a hashing function on the cell contents.

Step 44—Finally, the functions of the selected cells are combined in some manner, for example, by summing or exclusive-ORing, by time integration, or by simple colloquation.

Rather than the signature being unitary in nature, it can be composed of a set of one or more "signettes" of respective known types, each signette being derived independently of the other signettes and each being characteristic in its own way (but with limited specivity) of the event. Thus, for example, the following signettes may be defined:

Signette type 1—exclusive OR of all cell-content bytes;

Signette type 2—crc-8 all cell-content bytes;

Signette type 3—exclusive OR of alternate cell-content bytes;

Signette type 4—etc . . .

By "cell-content bytes" is meant the bytes of the non-header portion of the or each cell, or a selected such cell, giving rise to the event.

Figure 3:
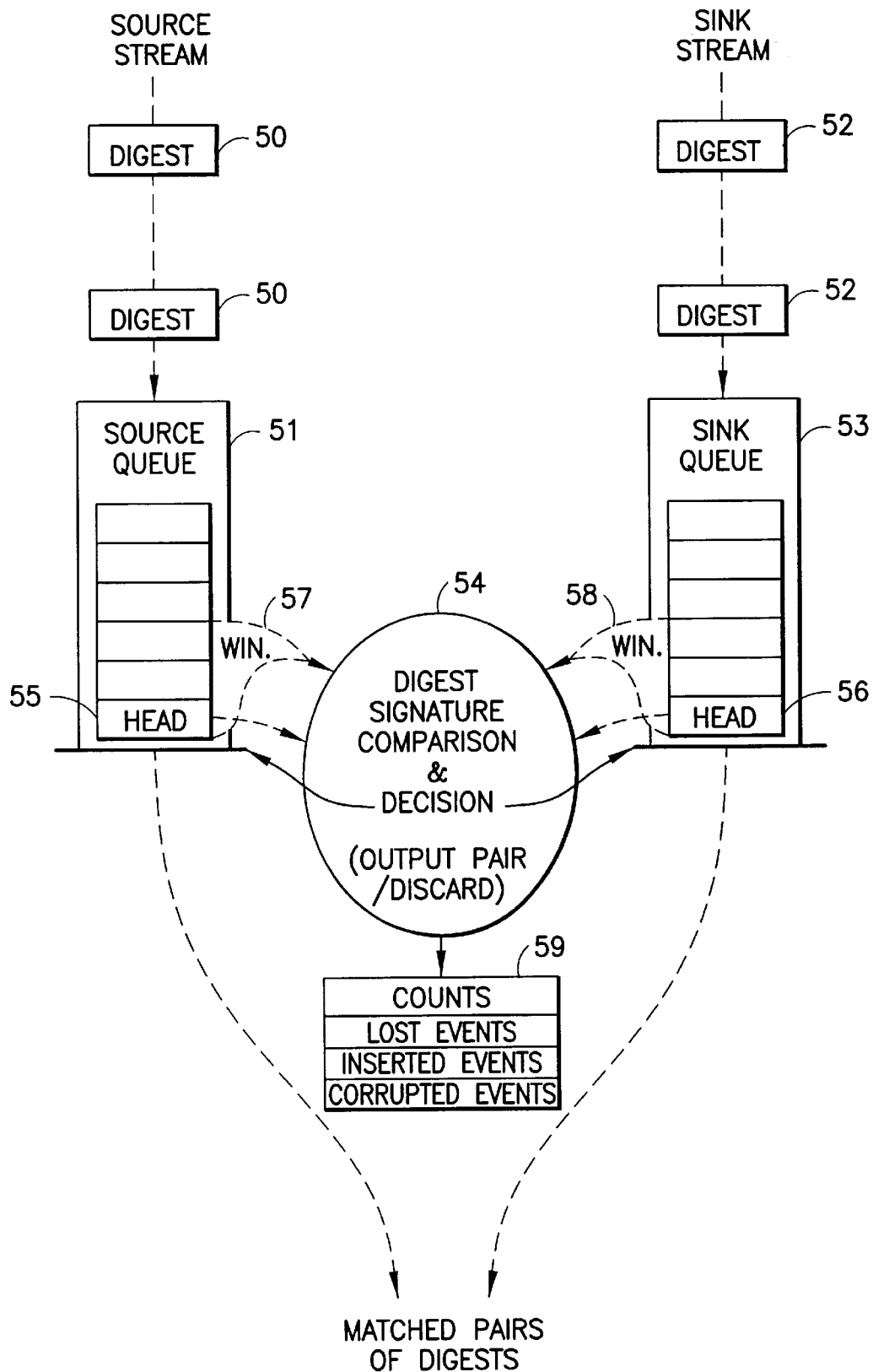
FIG. 3 is a diagram illustrating the main functional mechanisms of an event correlator of the FIG. 1 measurement station.

As illustrated in FIG. 3, the signature may be composed of a selected number of signettes arranged in an order that remains fixed regardless of how many signettes are present, the number of such signettes present being specified in a signature length byte. Thus, the signature 46 shown in FIG. 3A comprises seven signettes each of one signette-value byte, these signettes being of predetermined types 1 to 7; FIG. 3B show s another signature 47 formed using the same predetermined signettes types and in this case there are five signettes.

Figures 4, 4A:
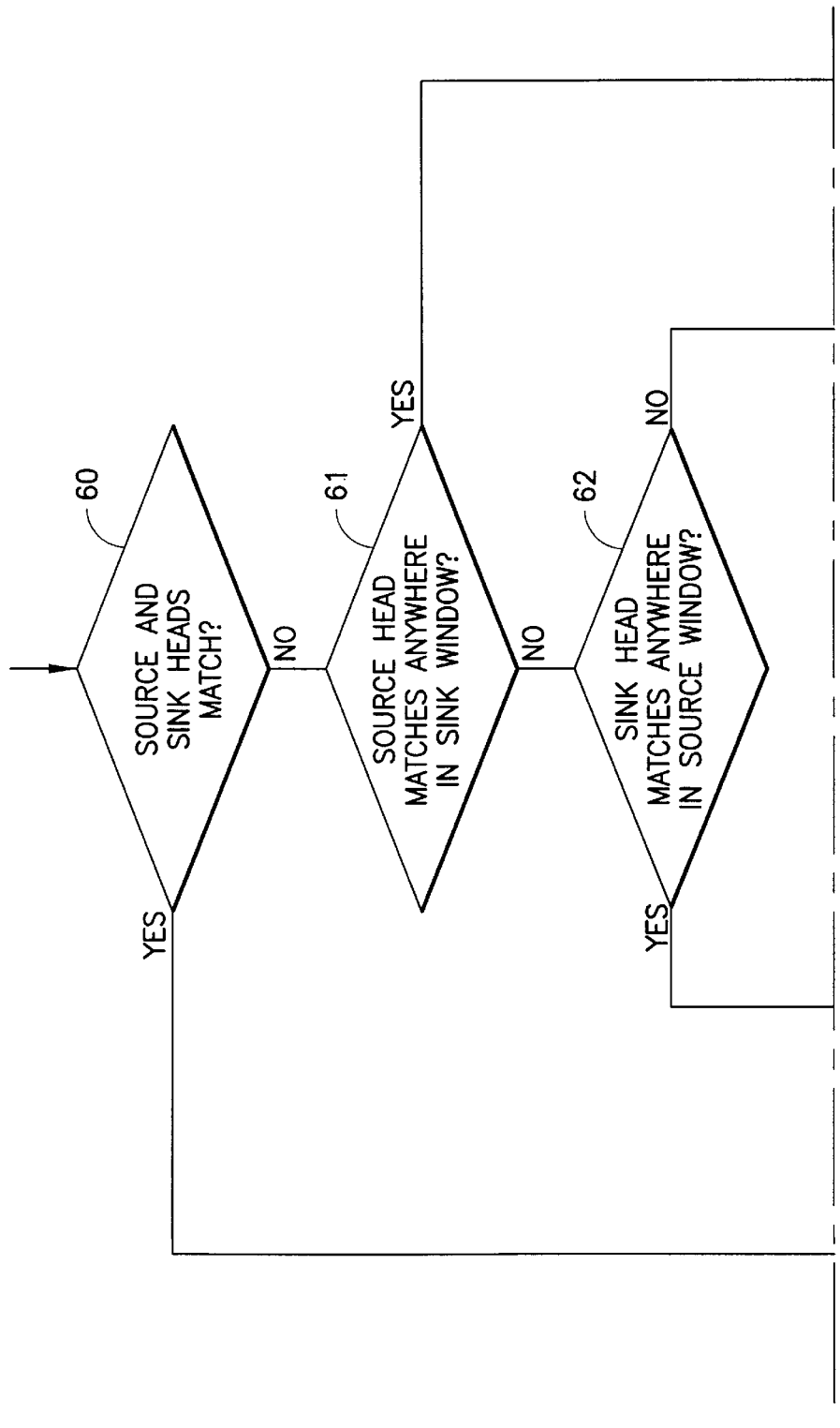
FIG. 4 is a flow chart illustrating the main processing steps executed by the event correlator of FIG. 3.
Figure 4B:
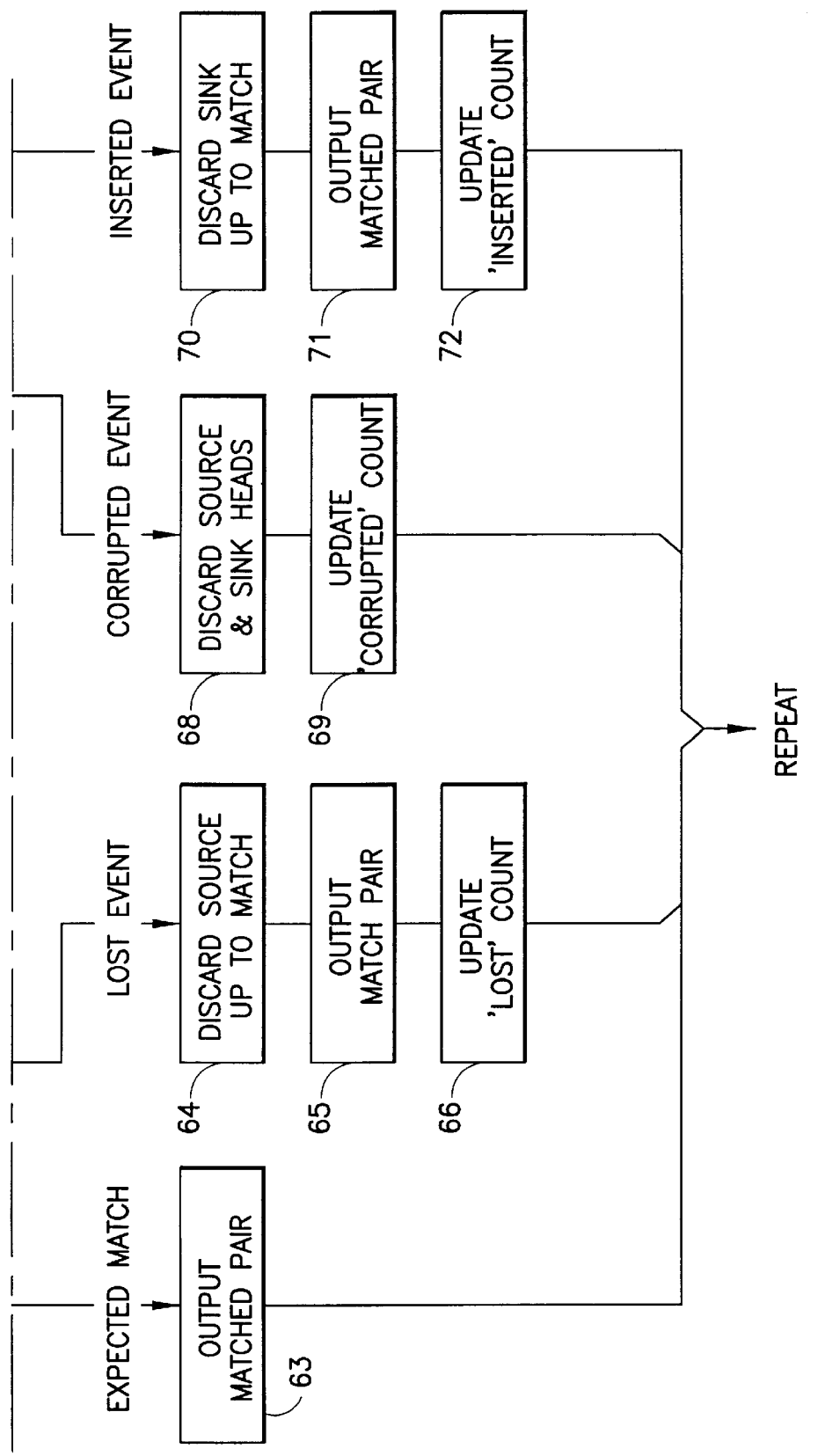

FIG. 4 shows a more flexible, but more space consuming, arrangement for a signature 48 made up of signettes. In this case, each signette is made up of a pair of bytes, namely a signette type byte followed by a signette value byte. Again, there is a signature length byte specifying the number of signettes present.

It will be appreciated that the structure and composition of a signature made up of signettes may differ from that described. Since the generation of the signettes generally requires the same cell data to be reworked several times, the signature generation process of FIG. 2 will normally require steps 42 and 43 to be repeated for each signette (though if each signette relates to a different set of bits then this may not be necessary). The advantage of using a signature made up of a plurality of signettes will be apparent hereinafter in relation to digest-stream bandwidth control.

In addition to the event signature, a digest will generally also contain one or more timestamps, such as the timestamp of one or more related cells, or the timestamp for the time of occurence of the event. Furthermore, the digest may contain an identifier of the criteria used to define the event. This latter component is useful where the event definition has just been changed and the measurement station needs to be sure of the nature of the event being reported. Another situation in which event criteria identification is useful is where two (or more) different event types are being simultaneously searched for by the units 21 (and digest matches checked for by correlator 30).

The three components (signature, timestamp, criteria identity) of a digest are then combined in step 45 to form the complete digest.

Event Correlator

The source and sink digest streams are fed to the event correlator 30 which forms part of a measurement station 27. This station will generally be conveniently located at a central location remote from the event-capture units 21 though the station could be co-located with one of the units 21. Communication between the measurement station 27 and the event-capture units 21 may be by communication links independent of the network 10 or the network 10 may be used to provide the required communication.

Upon the event correlator 30 determining that two digests, one from the source stream 28, one from the sink stream 29, both relate to the same event, the correlator outputs the matched digest pair to a quality-of-service (QoS) measurement unit 31. The digest pairing process effected by the correlator 30 is described below.

Figure 5:
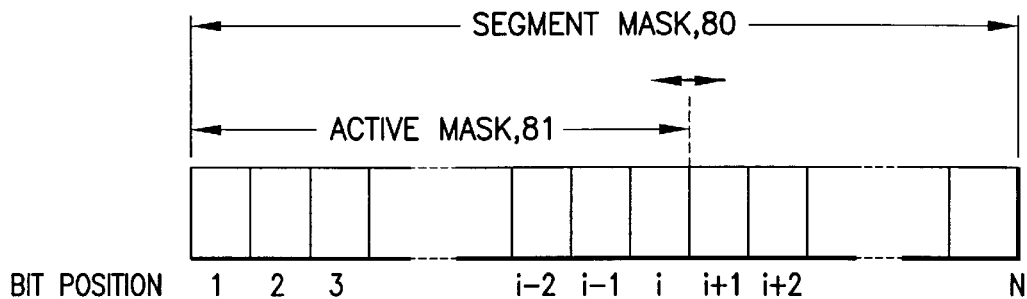
FIG. 5 is a diagram illustrating the form of a bit mask used as an event selection criterion by the FIG. 1 event-capture units.

FIG. 5 illustrates the general mechanism implemented by the event correlator 30. Digests 50 in the source digest stream are queued in order of receipt in a source queue 51 (typically a linked list). Similarly, digests 52 in the sink digest stream are queued in order of receipt in a sink queue 53. A comparison process 54 (processor implemented) then seeks to match digests between the two queues by comparing and matching their signatures, it being assumed that digests with the same signature relate to the same event.

If the connection provided by network 10 between points A and B was perfect, then all events detected at point A would also be detected at point B and no additional events would be detected at point B. In this case, once a synchronism had been achieved between the two queues, the head entries 55 and 56 of the source and sink queues should always match and they could be output as successive matched pairs. However, in real networks the possibility exists of cell lost, corruption, repetition and insertion which in turn can lead to event insertion, loss or corruption. Event insertion corresponds to the situation where the head entry of the source queue 51 matches not with the head entry 56 of sink queue, but with say, the fifth entry of that queue, the first four entries of the sink queue having no equivalent in the source queue. Similarly, event loss corresponds to one or more entries at the front of the source queue having no equivalents in the sink queue, the head entry of this queue matching with, for example, the fifth entry of the source queue. A corrupted event will have entries appearing in both queues but these entries will not match each other or any other entry.

The comparison process 54 is arranged to look not only for expected matches but also for lost, inserted and corrupted events. However, in practise, it is necessary to place some limitations on the extent of the comparisons effected between the queues in detecting lost, inserted and corrupted events. In particular, where the head entries of the source and sink queues do not match, further comparison is limited to a window of the first N entries of each queue (the value of N may be different for each queue but it will generally be the same; for example N=3). The following informal definitions are then used:

Expected Match: head entry of source queue matches head entry of sink queue;
Inserted Event: head entry of source queue matches with one of first N entries of sink queue other than head entry;
Lost Event: head entry of sink queue matches with one of first N entries of source queue other than head entry;
Corrupted Event: head entry of source queue does not match any of first N entries of sink queue and head entry of sink queue does not match any of first N entries of source queue.

Figure 6:
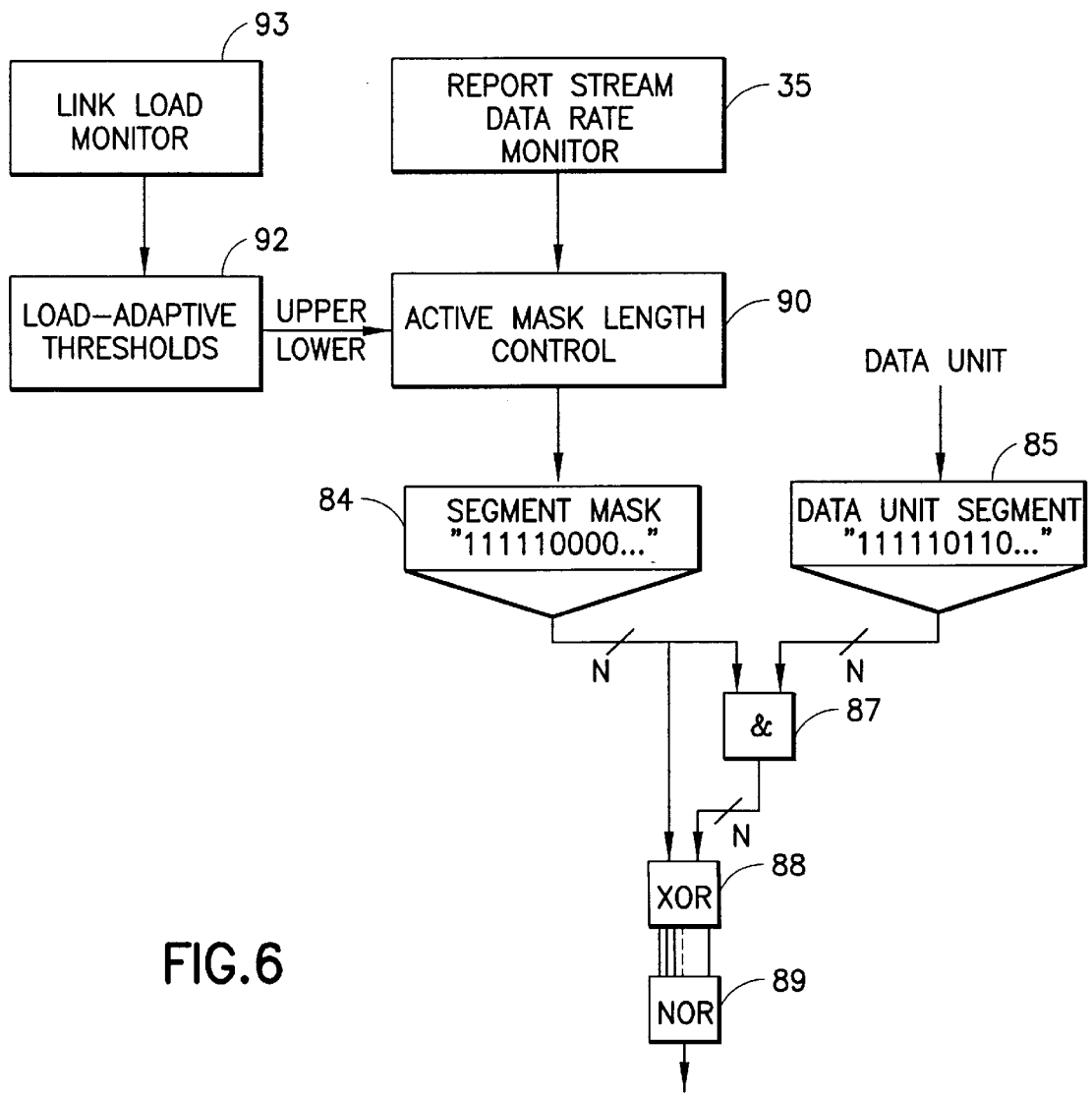
FIG. 6 is a functional block diagram of an arrangement for controlling the data rate of the report stream output by each event-capture units.

FIG. 6 is a flow chart illustrating the entry matching process. At step 60 the head entries of the source and sink queues are compared; if they match, this corresponds to an 'Expected Match' and the head entries are output as a matched pair of digests (step 63). If the head entries did not match, the head entry of the source queue is then compared in step 61 with the second, third etc entries in the sink queue until either a match is found or the limit set by the window value N is reached. If a match is found, this corresponds to an Inserted Event; the sink entries up to the matched entry are then discarded (step 70), the matched entries output as the matched digest pair (step 71), and a count of Inserted Events is updated (step 72) in correspondence to the numbers of sink entries discarded. However, if no match is found in step 61, the head entry of the sink queue is compared (step 62) with the second, third, etc entries in the source queue until either a match is found or the limit set by the window value N is reached. If a match is found, this corresponds to a Lost Event; the source entries up to the matched entry are then discarded (step 64), the matched entries output as the matched digest pair (step 65), and a count of Lost Events is updated (step 66) in correspondence to the number of source entries discarded. However, if no match is found in step 62, this corresponds to a Corrupted Event; the head entries of the source and sink queues are discarded and a count of Corrupted Events is incremented.

The outputting of the matched pairs of digests may, of course, only involve pointer adjustment rather than physical data transfer. Furthermore, if only part of each matched digest is required for subsequent processing by the QoS measurement unit 31, then only that part need be output from the corresponding queue. In this respect, often it will be possible to discard the digest signature after matching; however, this may not always be the case.

The counts of Inserted, Lost and Corrupted events are held in a count unit 59 (FIG. 5) and are periodically output to the QoS measurement unit 31.

When the correlator 30 first commences operation and prior to any matches being found, it may be appropriate to operate with a larger window size N for each queue than is subsequently used after a match has been found.

It will be appreciated that other event correlation methods are also possible.

QoS Measurement Unit

The QoS measurement unit 31 takes the information (such as time stamp data) contained in the digests and derives quality of service measures in standard manner well known to persons skilled in the art.

Changing the Criteria to Control Reporting Data Rate

The measurement station 27 includes a control unit 32 by means of which the event-type criteria stored in memory 23 of each event-capture unit 21 can be changed to effect different quality of service measurements (the control connections are illustrated by dotted lines in FIG. 1).

In addition, provision is also made to control the data rate of the report streams between the units 21 and station 27 in order to avoid these report streams stressing the links carrying them. This control is effected in dependence on the current report-stream data rate either independently for each report stream or in a coordinated manner for both streams in a manner to be explained below. For ease of explanation, it will initially be assumed that the data rate of each report stream is independently controlled.

The report-stream data rate control is effected by modifying the criterion set used to define the type of events to be detected, a more selective criterion set being chosen when it is desired to reduce the data rate of a report stream and a less selective criterion set being chosen when it is desired to increase the data rate. More particularly, in the preferred embodiment the selectivity of the criterion set is increased upon the data rate of a report stream exceeding an upper threshold data rate, and decreased upon the data rate of a report stream falling below a lower threshold data rate. These threshold data rates can be made dependent on the overall traffic loading of the links carrying the report streams, the threshold data rates being made lower the greater the traffic loading of the link.

The changing of the selectivity of the criterion set of an event capture unit is done in such a manner that the events detected with a more selective form of criterion set constitute a subset of the events that would have been detected with a less selective form of criterion set. More particularly, in the preferred embodiment, the currently-operative form of the criterion set is changed between predetermined forms each of different selectivity, each change of selectivity being from the currently-operative form to an adjacent one of the predetermined forms ("adjacent", that is, in terms of its selectivity). By making these predetermined forms of the criterion set the same for each event-capture units, the events detected by one of the two event capture units will be the same as, or a subset of, the events detected by the other event-capture unit.

At the implementational level, changing the selectivity of the criterion set can be done in a number of ways; for example:

the criterion set may comprise a bit-mask criterion specifying required bit values in predetermined cell body positions, the selectively of the criterion set being changed by increasing/decreasing the number of bit positions with specified values in the bit-mask criterion;

the criterion set may comprise a field-value criterion specifying acceptable values (such as a range of values) of at least one cell field, the selectively of the criterion set being changed by increasing/decreasing the number of acceptable values specified by the field-value criterion;

the criterion set may comprise a field-presence criterion specifying the presence of particular fields in a cell (or higher-level data unit carried by one or more cells), the selectively of the criterion set being changed by increasing/decreasing the number of fields specified by the field-presence criterion.

A more specific example is given later on of the variable bit mask arrangement.

Where the data rates of the two report streams are independently controlled, it is unlikely that changes in the currently-operative criterion set will occur at exactly the same time in both event-capture units though by making the thresholds controlling these changes the same in both units, the changes can generally be made to take place at roughly the same time (particularly if the thresholds are not made dependent of link loading since such loading may well be different for the two report streams). Nevertheless, the possibility exists that the events reported to the event correlator in the sink and source report streams may have been selected by different criterion sets; this situation can present difficulties for the correlator as there will now be many more unmatchable events in the report stream associated with the less-selective criterion set. Accordingly, provision is made for the correlator 30 to identify such situations by tracking the criterion set used for each event. This can be achieved either by reporting an indicator of the currently-operative criterion set in each digest or by the correlator being informed of each change in the criterion set operated by an event capture unit. In this manner, the correlator can determine whether different criterion sets are currently being operated by the two event capture units—if this is not the case, then the correlator can operate normally, whereas if the criterion sets are found to be diffferent, the correlator can either attempt to operate normally or suspend operation until the criterion sets become the same again. Neither of these approaches is fully satisfactory and therefore it is preferred to assist the correlator by including in each digest an indication as to whether the event to which the digest relates would also have been detected if the next more-selective criterion set had been used. Now where the correlator detects that the events in the source and sink streams have been selected with different criterion sets, it can immediately ignore those events in the stream associated with the less-selective criterion set that, according the aforesaid indication included in the event digests, would not have been selected if the next more selective criterion set had been applied. Assuming that generally the criterion sets used by the two event-capture units will only be one change different, use of the aforesaid indication enables most of the unmatchable events in the less-selective stream to be removed.

Where the report-stream data rates are independently controlled for each of the event-capture units, the control functionality can be provided either in the units 21 (together with associated rate monitor probes 35 for measuring the report-stream data rate) or in the control unit 32 of the measurement station (in which case the rate monitor probes 35 will normally be associated with the measurement station).

As already mentioned, rather than the report-stream date rates being independently controlled, a degree of coordination can be introduced by arranging for the event-capture units to effect simultaneously the same criterion set changes. Such coordination can conveniently be done by the control unit 32 of the meaurement unit. More particularly, where the data rate of one digest stream reaches its upper threshold, this is reported by the corresponding unit 35 to the control unit 32 which instructs both event-capture units 21 to increase the selectivity of the operative criterion set (to the same predetermined level). Similarly, where a rate monitor unit 35 determines that its monitored report-stream data rate has fallen below the lower threshold, this is reported to the control unit 32; if both rate monitor units 35 have so reported, the unit 32 then instructs both event-capture units to decrease the selectivity of the criterion set being used to the same less-selective form.

As regards the positioning of the rate monitor unit 35, if the links carrying the digest streams are direct point-to-point links between the event-capture units and the measurement station, it does not matter at which end the links are monitored even where the reporting data rate thresholds are adaptively varied according to the link loading. However, frequently this will not be the case and it may then be more appropriate to monitor the reporting data rate at one or other end of the link. In FIG. 1, the rate monitor units 35 are shown external to the capture units 21 and measurement station 27 so as to indicate that the units 35 may be provided in either the capture units 21 or the station 27.

By way of illustration of the above-described report-stream data rate regulation techniques, FIGS. 5 and 6 illustrate the operation of an arrangement for regulating the report data rate of one of the event capture units 21 by varying the effective length of a bit mask used as a cell selection criterion. More particularly, a segment bit mask 80 of fixed length N is defined and serves to delimit a particular segment of each detected cell body. Within the segment mask is further defined an active mask 81 of variable length i extending from bit position 1 of the segment mask. In the present example, a bit-mask criterion is defined that requires all bits of the active mask to have a binary value "1"; by giving all bit positions i+1 to N of the segment mask a binary value "0", a single mask can be used to specify both the length of the active mask 81 within the segment mask 80 and the required bit values of the active mask 81.

As depicted in FIG. 6, the segment mask with the contained active mask is held in register 84 and a predetermined segment of each newly detected cell (data unit) is stored in register 85. The contents of these two registers are then compared and if bit positions 1 to i of the register 85 all contain binary "1", a logic "1" output is produced to indicate that the cell concerned has met the bit-mask criterion. The circuitry used to effect this comparison is an N-bit wide AND gate 87 effecting a bitwise AND function on the output of the registers 84 and 85 to produce an N-bit wide output, an N-bit wide Exclusive-OR gate 88 effecting a bitwise XOR function on the output of register 84 and gate 87 to produce an N-bit wide output, and an N input NOR gate 89 producing a logic "1" only when all its inputs are "0" (corresponding to the inputs of the gate 88 being identical).

If the value of each bit position in the predetermined segment of each detected cell is equally as likely to be a "1" as a "0", then extending the length of the active bit mask by one should, on average, half the number of cells meeting the bit-mask criterion. Thus, if with an active mask length of i, the number of cells satisfying the bit mask criterion in unit time (the "hit rate") is R, then as i varies, the hit rate will vary as follows:

| active mask length | "hit" rate |
|---|---|
| i − 2 | 4R |
| i − 1 | 2R |
| i | R |
| i + 1 | R/2 |
| i + 2 | R/4 |

The circuitry for controlling the value of i comprises an active-mask-length control unit 90, a report-stream data rate monitor 35, a threshold unit 92, and a link load monitor 93. The threshold unit 92 generates upper and lower thresholds for the report-stream data rate and passes these thresholds to the control unit 90. These thresholds have values dependent on the current traffic loading of the link carrying the report stream, this loading being measured by the monitor 93. The control unit is also fed with a current value of the report-stream data rate (generally, a short-term average) from the data rate monitor 35. The control unit keeps a record of the current length i of the active bit mask. If the measured report-stream data rate exceeds the current upper threshold, the control unit 90 increments the current value i of the bit mask length and sets the (i+1)th bit of register 84 to "1". Conversely, if the measured report-stream data rate falls below the current lower threshold, the control unit 90 decrements the value of the bit mask length and sets the ith bit of register 84 to "0".

As will be appreciated by persons skilled in the art, although in the above example all the bit positions of the active mask 81 were required to have a value "1", it is also possible to specify any desired combinations of "0" and "1" values for the active mask at the expense of slightly more complicated comparison circuitry. When the event-capture units are first started, the active mask may be arranged to assume a particular length (for example, a minimum or maximum length). Alternatively, the report stream may be initially suppressed whilst an estimate is made of the hit rate with different mask lengths, an appropriate length then being chosen.

Variants

In the foregoing description, it has been assumed that both event-capture units operate with the same event-type criteria (except for possible diffferences resulting from uncoordinated changes in the operative criterion set). In fact, in certain circumstances it may be desired to use sets of criteria that are not identical but have substantial areas of overlap (in the sense that they are non mutually exclusive with a substantial number of the events satisfying one set of criteria also satisfying the other set of criteria). By way of example, consider four event-capture units ECU_1 to ECU_4 situated at different points on a network and arranged to detect events specified in terms of the value of a field X of data units of a particular connection, the specified values of field X being as follows:

| | |
|---|---|
| ECU_1 | Field X = 16 or 17; |
| ECU_2 | Field X = 17 or 18; |
| ECU_3 | Field X = 18; |
| ECU_4 | Field X = 16. |

The criterion set of ECU_1 and ECU_2 overlap whereas the criterion set of ECU_3 is a subset of that of ECU_2 and the criterion set of ECU_4 is a subset of ECU_1. By matching signatures of the events reported by ECU_1 and ECU_2, events with a value "17" of field X can be monitored between the network points at which ECU_1 and ECU_2 are located. Similarly, by matching signatures of the events reported by EC U_1 and ECU_4, events with a value "16" of field X can be monitored between the network points at which ECU_1 and ECU_4 are located. Again, by matching signatures of the events reported by ECU_2 and ECU_3, events with a value "18" of field X can be monitored between the network points at which ECU_2 and ECU_3 are located. In this manner, three measurements across the network are achieved using only four event-capture units. Of course, with such an arrangement one or both of the digest streams fed to the event correlator tasked with matching events having a particular value of field X, will contain inherently unwanted event digests that must be discarded. In order to take account of this, the size of the window used in the event correlation process described above will need to be appropriately sized or each digest must indicate the criteria satisfied so that the correlator can ignore digests in which it has no current interest. It will appreciated that the foregoing example is given by way of illustration and has been intentionally kept simple to facilitate understanding of the principle that the criterion sets need not be identical at each event-capture unit.

Although in the foregoing the regulation of the data rate of an event report stream has been described with respect to an arrangement having two event capture units each producing a respective report stream, it will be appreciated that report-stream data-rate regulation according to the invention is equally applicable to situations where there is only a single report stream. Furthermore, although the foregoing description related to the monitoring of a connection for transferring ATM cells across a network, the invention is equally applicable to other types of connection and data unit (including SD H units) even though subject to possible multiplexing/mixing with units from other streams. In particular, the term "data unit" includes both discrete packets, cells or frames directly appearing on a network link, and logical structures that may be transferred in the former (including by segmentation across such units) and may be at several removes of a logical structuring hierarchy from the units actually appearing on the network.

As regards the term "connection", as used herein this term refers to the general mechanism set up (of whatever form) for transferring data across the network from some given source to some given destination. In the embodiment described above, the connection being monitored is in the form of a virtual circuit with the individual data units only carrying information about their next hop, the network nodes being responsible for routing and updating the units as required. In another possible form of connection, a physical circuit is established through the network, in which case data to be transferred need not be divided up into units or, if it is, these units need carry no routing or connection indicator. In a further form of connection, data is transferred in data units which are individually routed along the same or different network paths (such as with TCP packets on the Internet) in which case the data units carry information about their eventual destination.

Application of the present invention is not limited to apparatus for monitoring data units being transferred over a connection, and the present invention can be applied in any situation where monitoring apparatus is used to monitor an ongoing input to detect and report predetermined types of event.

What is claimed is:

1. Apparatus for monitoring an on-going input to detect and report events of predetermined type, said apparatus comprising:

means for storing an event definition defining an event in terms of a criterion set of one or more criteria to be met by said on-going input;

monitoring means for monitoring said on-going input to detect occurrences therein of a said event satisfying said criterion set;

report means for generating a report stream containing data on the detected events, the data rate of the report stream increasing with the number of detected events;

means for producing an indication of the data rate of said report stream; and control means for regulating the data rate of said report stream in dependence on said indication, this regulation being effected by changing said event definition to change the selectivity of said criterion set in such a manner that the events detected with a more selective form of said criterion set constitute a subset of the events that would have been detected with a less selective form of said criterion set.

2. Apparatus according to claim 1, wherein said control means comprises:

reference means defining upper and lower threshold data rates, and regulating means, responsive to said threshold data rates and to said indication of the data rate of the report stream, to:

increase the selectivity of said criterion set upon said indication indicating that the data rate of the report stream exceeds said upper threshold data rate, and decrease the selectivity of said criterion set upon said indication indicating that the data rate of the report stream has fallen below said lower threshold data rate.

3. Apparatus according to claim 1, wherein said report stream is output on a data link that can also carry other traffic, said reference means including:

load measuring means for measuring the traffic loading of said link, and means for adjusting said threshold data rates according to the measured traffic loading such that the threshold data rates are lower the greater the traffic loading of the link.

4. Apparatus according to claim 1, wherein said control means is operative to change the selectivity of said criterion set by changing the currently-operative form of said criterion set between predetermined forms each of different selectivity, each change of selectivity being from the currently-operative form of said criterion set to an adjacent said predetermined form in terms of its selectivity.

5. Apparatus according to claim 1, wherein said on-going input represents a succession of data units in transfer over a connection across a network.

6. Apparatus according to claim 5, wherein said on-going input represents said data units as bit patterns, said criterion set comprising a bit-mask criterion specifying required bit values in predetermined positions of said bit patterns, said control means increasing/decreasing said selectivity of the criterion set by increasing/decreasing the number of bit positions with specified values in said bit-mask criterion.

7. Apparatus according to claim 5, wherein said data units each comprise a plurality of fields, said criterion set comprising a field-value criterion specifying acceptable values of at least one said field, said control means increasing/decreasing said selectivity of the criterion set by increasing/decreasing the number of said acceptable values specified by said field-value criterion.

8. Apparatus according to claim 5, wherein said data units each comprise a plurality of fields with at least some of the data units having different compositions in terms of their fields, said criterion set comprising a field-presence criterion specifying the presence of particular said fields in a data unit, said control means increasing/decreasing said selectivity of the criterion set by increasing/decreasing the number of said particular fields specified by said field-presence criterion.

9. Apparatus according to claim 5, wherein:

said report means is operative to generate for each detected event an event report having a signature characterisitic of that specific event, the report means comprising signature means for deriving said signature from the said group of at least one said data unit associated with the event concerned;

said control means is operative to change the selectivity of said criterion set by changing the currently-operative form of said criterion set between predetermined forms each of different selectivity, said control means providing criterion-set data for identifying said currently-operative form of the criterion set;

the monitoring means, when detecting a said event on the basis of the currently-operative form of said criterion set, also provides an indicator for indicating whether a said event would also have been detected if the next more selective predetermined form of said citerion set had been the said currently-operative form; and said report means is operative to include in each said event report the said indicator associated with the same event, said report stream comprising said event reports and said criterion-set data.

10. A system for measuring the quality of service provided by a connection in transferring data units between first and second points across a network, said system comprising:

respective event-capture means associated with each of said first and second points, each event-capture means comprising a respective apparatus according to claim 9 with the said monitoring means of each apparatus being disposed to monitor said connection at the corresponding one of said first and second points, the said report stream generated by the report means of the event-capture means associated with the said first point forming a source report stream and the said report stream generated by the report means of the event-capture means associated with the said second point forming a sink report stream;

correlation means for receiving said source and sink report streams and for pairing from the two streams those event reports that relate to the same said event by matching their signatures, the event reports so paired constituting matched event-report pairs; and measurement means for utilising said matched event-report pairs to derive quality of service measurements therefrom in respect of the operation of said connection between said first and second points;

said correlation means including:

first means for determining from the criterion-set data of the source and sink report streams if the events reported in one stream have been detected using a criterion set that is more selective than events reported in the other stream, and second means responsive to a positive determination by said first means to disregard those events of said other stream which according to their associated said indicators would not have been detected with a more selective form of said criterion set than actually used in detecting those events.

11. Apparatus according to claim 1, wherein said report means is operative to include in said report stream, criterion-set data concerning the form of the criterion set used in detecting said events.

12. Apparatus according to claim 11, wherein criterion-set data takes the form of an indication of any change in said criterion set upon such change occurring.

13. Apparatus according to claim 1, wherein criterion set data takes the form of an indication, for each detected event, of the form of the criterion set used in detecting that event.

14. A method of monitoring an on-going input to detect and report events of predetermined type; said method comprising the steps of:

(a)—monitoring said on-going input to detect occurrences therein of a said event satisfying a criterion set of one or more criteria;

(b)—generating a report stream containing data on the detected events, the data rate of the report stream increasing with the number of detected events;

(c)—producing an indication of the data rate of said report stream, and (d)—regulating the data rate of said report stream, in dependence on said indication, by changing the selectivity of said criterion set in such a manner that the events detected with a more selective form of said criterion set constitute a subset of the events that would have been detected with a less selective form of said criterion set.

15. A method according to claim 14, wherein step (d) involves the sub-steps of:

increasing the selectivity of said criterion set upon said indication indicating that the data rate of the report stream exceeds an upper threshold data rate, and decreasing the selectivity of said criterion set upon said indication indicating that the data rate of the report stream has fallen below a lower threshold data rate.

16. A method according to claim 15, wherein said report stream is output on a data link that can also carry other traffic, step (a) including the further sub-step of generating said threshold data rates in dependence on the traffic loading of said link such that the threshold data rates are lower the greater the traffic loading of the link.

17. A method according to claim 14, wherein step (d) involves changing the selectivity of said criterion set by changing the currently-operative form of said criterion set between predetermined forms each of different selectivity, each change of selectivity being from the currently-operative form of said criterion set to an adjacent said predetermined form in terms of its selectivity.

18. A method according to claim 14, wherein said on-going input represents a succession of data units in transfer over a connection across a network, said criterion set comprising one or more criteria to be met by a group of at least one said data unit associated with said connection.

19. A method according to claim 18, wherein said on-going input represents said data units as bit patterns, said criterion set comprising a bit-mask criterion specifying required bit values in predetermined positions of said bit patterns, step (d) involving increasing/decreasing said selectivity of the criterion set by increasing/decreasing the number of bit positions with specified values in said bit-mask criterion.

20. A method according to claim 14, wherein step (b) further involves including in said report stream, criterion-set data concerning the form of the criterion set used in detecting said events.

* * * * *